United States Patent
Nakamura et al.

(10) Patent No.: US 12,384,472 B2
(45) Date of Patent: Aug. 12, 2025

(54) VEHICLE REAR STRUCTURE

(71) Applicant: Honda Motor Co., Ltd., Tokyo (JP)

(72) Inventors: Yuki Nakamura, Tokyo (JP); Kei Ambo, Tokyo (JP); Kenichi Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 376 days.

(21) Appl. No.: 18/164,608

(22) Filed: Feb. 5, 2023

(65) Prior Publication Data

US 2023/0257037 A1 Aug. 17, 2023

(30) Foreign Application Priority Data

Feb. 17, 2022 (CN) .......................... 202210147944.6

(51) Int. Cl.
*B62D 35/00* (2006.01)
(52) U.S. Cl.
CPC .................................. *B62D 35/007* (2013.01)
(58) Field of Classification Search
CPC ...... Y02T 10/82; B62D 37/02; B62D 35/007; B60R 19/48
See application file for complete search history.

(56) References Cited

U.S. PATENT DOCUMENTS

| | | | |
|---|---|---|---|
| 9,527,535 B1 * | 12/2016 | Cha .......................... | B60R 19/48 |
| 2006/0033347 A1 * | 2/2006 | Hauger .................. | B62D 65/00 |
| | | | 293/133 |
| 2012/0248819 A1 | 10/2012 | Okamura et al. | |
| 2015/0166130 A1 | 6/2015 | Lee et al. | |
| 2018/0134331 A1 | 5/2018 | Yoon et al. | |
| 2023/0257038 A1 | 8/2023 | Nakamura et al. | |

FOREIGN PATENT DOCUMENTS

| | | | |
|---|---|---|---|
| CN | 102730075 | 10/2012 | |
| CN | 102862534 | 1/2013 | |
| CN | 116654127 | 8/2013 | |
| CN | 106515880 | 3/2017 | |
| CN | 108068901 | 5/2018 | |
| EP | 3230130 B1 * | 7/2019 | ........... B29C 70/523 |

OTHER PUBLICATIONS

EP 1757488 A2 (Year: 2007).*
KR 20150129254 A (Year: 2015).*
"Office Action of China Counterpart Application No. 202210147944.6", issued on Jul. 1, 2025, with English translation thereof, p. 1-p. 13.

* cited by examiner

*Primary Examiner* — Lori Lyjak
(74) *Attorney, Agent, or Firm* — JCIPRNET

(57) ABSTRACT

A vehicle rear structure includes a spoiler device at a rear bumper of a vehicle; a floor panel; left and right side frames at two sides of the floor panel and extending along a front-rear direction of the vehicle; and an impact beam extending along a left-right direction of the vehicle and connected to rear ends of the left and right side frames through a connecting portion. The spoiler device includes a movable portion movable between a storage position connected to the rear bumper and an expansion position protruding from the rear bumper toward a rear side of the vehicle; and at least one fixed portion including a driving component for driving the movable portion to move in the front-rear direction of the vehicle, at a further rear side of the floor panel, and at the connecting portion connected between the left and right side frames and the impact beam.

6 Claims, 6 Drawing Sheets

(A)

(B)

(A)

(B)

VEHICLE REAR STRUCTURE

CROSS-REFERENCE TO RELATED APPLICATION

This application claims the priority benefit of Chinese application no. 202210147944.6, filed on Feb. 17, 2022. The entirety of the above-mentioned patent application is hereby incorporated by reference herein and made a part of this specification.

BACKGROUND

Technical Field

The disclosure relates to a vehicle rear structure.

Description of Related Art

In recent years, with limitation of regulations on vehicle exhaust and regulations on CO2/fuel efficiency, it is required to achieve cleaning of engine exhaust and improvement to fuel consumption efficiency at the same time. Construction of safe cities and human settlements has been strengthened in all countries to strengthen inclusive and sustainable urban development, sustainable human settlements planning, and management capacity in all countries. Accordingly, it is necessary to strengthen the provision of safe, affordable, accessible, and sustainable transportation systems to all people in all countries; it is necessary to improve road safety, particularly expansion of public transport; and it is necessary to reduce urban per capita negative environmental impact, including special attention to air quality and urban waste management. In vehicle manufacturing industries in the field of transportation, there is a need to take measures to address environmental concerns in order to develop technology that increases the rate of improvement in global energy efficiency.

As a vehicle drives at an increasing driving speed, a contact force of tires on the ground decreases, so stability during driving is reduced and there also are some limitations on acceleration of the vehicle. To address these concerns, conventionally proposed is a spoiler device (also referred to as an air spoiler) disposed on a rear bumper of a vehicle to change an airflow. The spoiler device is typically categorized into a nose spoiler mounted at the front of the vehicle, a roof spoiler mounted at the roof, and a tail spoiler mounted at the rear end of the vehicle. For example, the tail spoiler is typically mounted beneath the surface of the rear bumper by a bolt, and has a structure of a rear spoiler fixed to the rear bumper.

In addition to the fixed spoiler device described above, there also exists a mobile-mode spoiler device that is movable in the conventional vehicle manufacturing industries. For example, Patent Document 1 (US Patent Application Publication No. US 2015/0166130 A1) proposes a spoiler apparatus that is disposed at a rear bumper of a vehicle, and actively changes the amount of protrusion of the spoiler apparatus in accordance with the traveling speed of the vehicle. In the spoiler apparatus of Patent Document 1, when the vehicle travels, by moving a spoiler rod of the spoiler apparatus toward the rear side of the vehicle, the spoiler apparatus functions as a rear bumper when the vehicle is in stop or travels at a low speed, and the spoiler apparatus functions as a spoiler device when the vehicle travels at a high speed. As such, in Patent Document 1, the aerodynamic performance of a vehicle is improved to an optimal level in accordance with the traveling speed of the vehicle.

However, in the technology of spoiler apparatus of Patent Document 1, during high-speed driving of a vehicle, the spoiler rod of the spoiler apparatus is driven to move the spoiler apparatus toward the rear side of the vehicle, without considering the aspect of whether a driving component for driving the spoiler apparatus to move is mounted at a position that can be protected when being subjected to an impact load. Accordingly, there is a need for a vehicle rear structure designed in consideration of the likelihood of bearing an impact load within a limited space for arrangement and preventing the driving component from being affected by the impact load.

SUMMARY

The disclosure provides a vehicle rear structure, including a spoiler device, a floor panel, a pair of left and right side frames, and an impact beam. The spoiler device is disposed at a rear bumper of a vehicle and includes a movable portion and at least one fixed portion. The movable portion is disposed movable between a storage position connected to the rear bumper and an expansion position protruding from the rear bumper toward a rear side of the vehicle. The at least one fixed portion includes a driving component for driving the movable portion to move in a front-rear direction of the vehicle. The pair of left and right side frames are disposed at two sides of the floor panel and extend along the front-rear direction of the vehicle. The impact beam extend along a left-right direction of the vehicle and is connected to rear ends of the pair of left and right side frames through a connecting portion. The at least one fixed portion is located at a further rear side of the floor panel, and is disposed at the connecting portion connected between the pair of left and right side frames and the impact beam.

DESCRIPTION OF THE EMBODIMENTS

Figure 1:
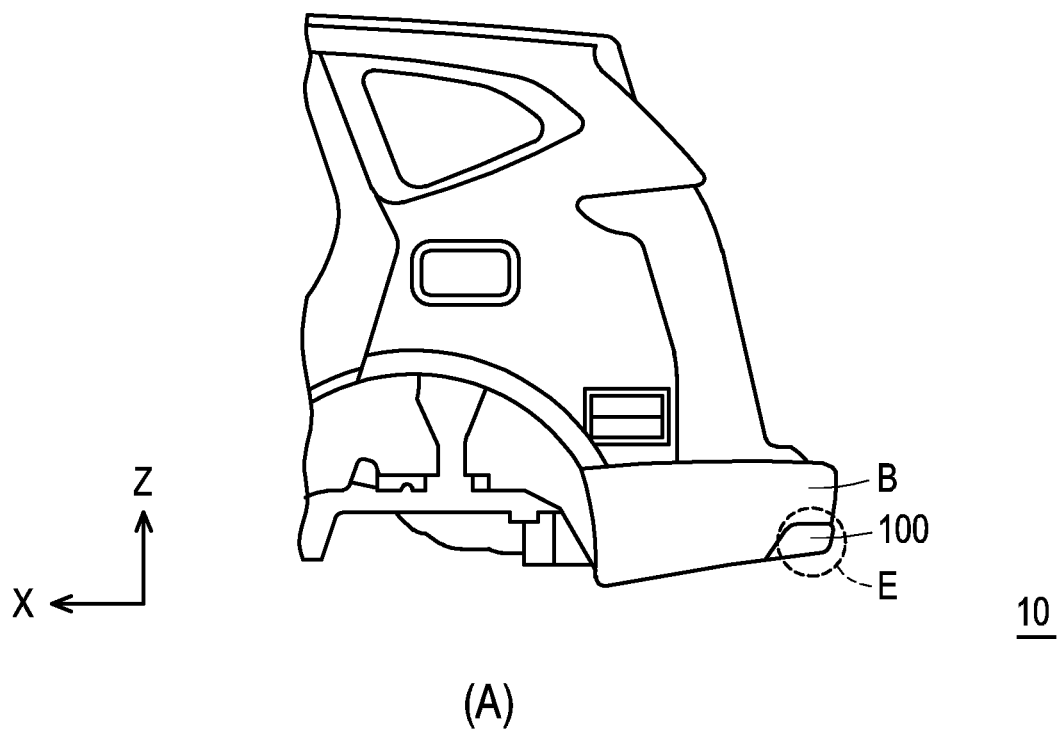
FIG. 1 is a schematic diagram illustrating an example of a vehicle rear structure provided with a spoiler device according to an embodiment of the disclosure; (A) in FIG. 1 shows the state of a movable portion of the spoiler device at a storage position; (B) in FIG. 1 shows the state of the movable portion of the spoiler device at an expansion position.
Figure 1:
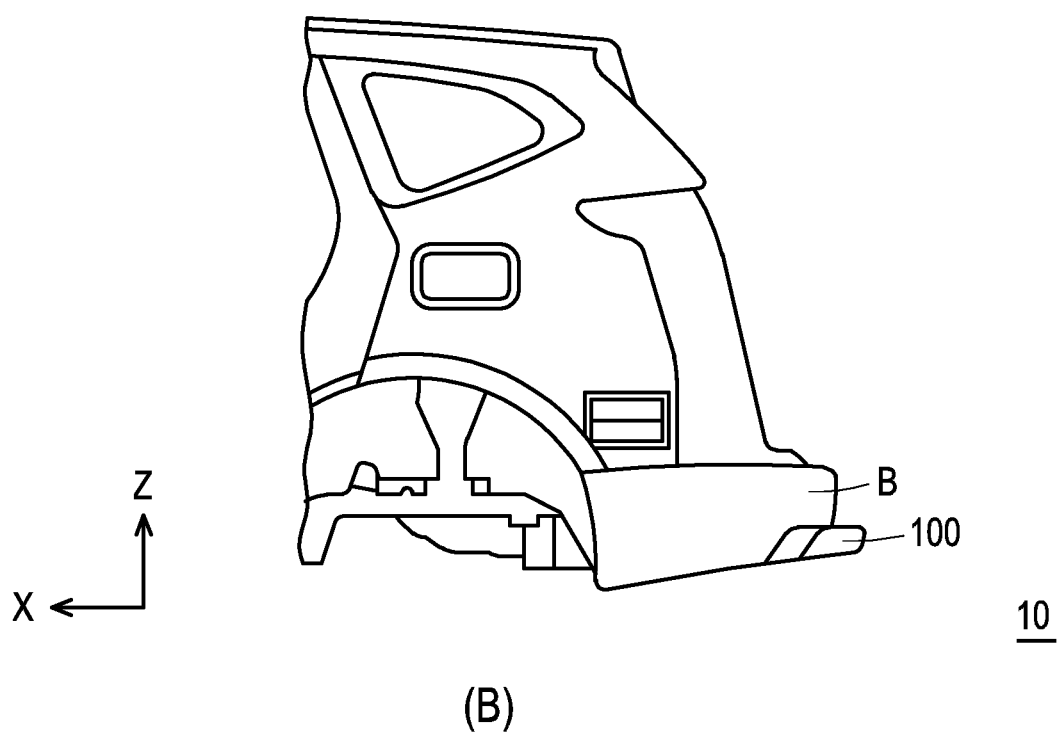

The disclosure provides a vehicle rear structure that can prevent a driving component from being affected by an impact load, improving the quality of the vehicle rear structure.

An embodiment of the disclosure provides a vehicle rear structure, including a spoiler device, a floor panel, a pair of left and right side frames, and an impact beam. The spoiler device is disposed at a rear bumper of a vehicle and includes a movable portion and at least one fixed portion. The movable portion is disposed movable between a storage position connected to the rear bumper and an expansion position protruding from the rear bumper toward a rear side of the vehicle. The at least one fixed portion includes a driving component for driving the movable portion to move in a front-rear direction of the vehicle. The pair of left and right side frames are disposed at two sides of the floor panel and extend along the front-rear direction of the vehicle. The impact beam extend along a left-right direction of the vehicle and is connected to rear ends of the pair of left and right side frames through a connecting portion. The at least one fixed portion is located at a further rear side of the floor panel, and is disposed at the connecting portion connected between the pair of left and right side frames and the impact beam.

According to the embodiment of the disclosure, designed in consideration of the likelihood of bearing an impact load within a limited space for arrangement, the vehicle rear structure can prevent the driving component from being affected by the impact load, improving the quality of the vehicle rear structure.

In addition, in an embodiment of the disclosure, the at least one fixed portion is mounted on a beam connecting plate sandwiched between the pair of left and right side frames and the impact beam.

According to the structure of the embodiment, by sandwiching the beam connecting plate between the left and right side frames and the impact beam and by mounting the fixed portion on the beam connecting plate, the structural strength is further improved, and the driving component is prevented from being affected by the impact load.

In addition, in an embodiment of the disclosure, the movable portion includes a main body portion extended in the left-right direction of the vehicle, and a length of the main body portion is longer than a distance between the pair of left and right side frames.

According to the structure of the embodiment, by disposing the main body portion of the movable portion is such that the length thereof is longer than the distance between the pair of left and right side frames, even if separation between the spoiler device and the rear bumper forms a gap, the main body portion of the movable portion can prevent foreign objects such as rolled-up mud or gravel from entering the interior of the rear bumper and the spoiler device, providing protection.

In addition, in an embodiment of the disclosure, the at least one fixed portion includes a guiding protrusive portion extending in the front-rear direction, the main body portion is formed with a guiding groove extending along the front-rear direction, and the guiding protrusive portion is slidable along the guiding groove.

According to the structure of the embodiment, by disposing the guiding groove and the guiding protrusive portion slidable along the guiding groove, the movable portion can be moved smoothly and stably between the storage position and the expansion position, not only improving the structural strength to prevent the driving component from being affected by the impact load, but also further improving stability of the spoiler device.

Based on the foregoing, in the vehicle rear structure of the embodiments of the disclosure, by disposing the fixed portion for mounting the movable portion for driving the spoiler device at the connecting portion connected between the pair of left and right side frames and the impact beam, since the side frames and the impact beam are support components with relatively strong structural strength for the vehicle, the fixed portion can be protected. Accordingly, designed in consideration of the likelihood of bearing an impact load within a limited space for arrangement, the vehicle rear structure can prevent the driving component from being affected by the impact load, improving the quality of the vehicle rear structure.

Hereinafter, the embodiments of the disclosure will be described based on the drawings. In the embodiments described below, like or corresponding parts are labeled with the same reference numerals and description thereof will not be repeated in some cases. In the embodiments described below, the scope of the disclosure is not necessarily limited to the number, amount, and the like being referred to unless otherwise specified. In addition, in the embodiments below, each constituent element is not necessarily requisite for the disclosure unless otherwise specified. Furthermore, in the case where multiple embodiments are provided below, it is originally intended that the features of the embodiments are combinable with each other as appropriate unless otherwise specified.

A vehicle rear structure including the disclosed embodiments will be described with reference to the drawings. In the drawings, X represents a fore direction of a front-rear direction of the vehicle, Z represents an up direction of an up-down direction of the vehicle, and Y represents an inner direction of a width direction of the vehicle. In addition, the directions and positions in the description of the disclosure are defined on the premise that the front of the vehicle faces forward.

Hereinafter, the embodiments of the disclosure will be described with reference to the accompanying drawings. Hereinafter, a vehicle rear structure of this embodiment will be described with reference to the drawings. FIG. 1 is a schematic diagram illustrating an example of a vehicle rear structure provided with a spoiler device according to an embodiment of the disclosure. As shown in FIG. 1, a vehicle rear structure 10 is provided with a spoiler device 100 for adjusting and changing an airflow during vehicle driving, so the spoiler device is also referred to as an air spoiler. As shown in FIG. 1, the spoiler device 100 is disposed at a rear bumper B of a vehicle. In this embodiment, the spoiler device 100 is disposed as a movable spoiler device that may move relative to the rear bumper B in the front-rear direction of the vehicle. (A) in FIG. 1 shows the state of a movable portion of the spoiler device 100 at a storage position, and (B) in FIG. 1 shows the state of the movable portion of the spoiler device 100 at an expansion position. The spoiler device 100 includes a movable portion 110 and at least one fixed portion 120. The movable portion 110 is disposed movable between a storage position connected to the rear bumper B and an expansion position protruding from the rear bumper B toward a rear side of the vehicle.

As shown in (A) in FIG. 1, the movable portion 110 and the rear bumper B are visually continuous when the spoiler device 100 is at the storage position. Accordingly, the outer surfaces of the movable portion 110 of the spoiler device 100 and the rear bumper B are substantially coplanar when viewed from the lateral side or the rear side of the vehicle. As shown in (B) in FIG. 1, the movable portion 110 and the rear bumper B are separated when the spoiler device 100 is at the expansion position. The movable portion 110 of the spoiler device 100 protrudes toward the rear side of the vehicle when viewed from the lateral side or the rear side of the vehicle. At this time, the outer surfaces of the movable portion 110 and the rear bumper B are not coplanar.

The at least one fixed portion 120 includes a driving component 122 for driving the movable portion 110 to move in the front-rear direction of the vehicle. The driving component 122 may drive the movable portion 110 to reciprocate between the storage position as shown in (A) in FIG. 1 and the expansion position as shown in (B) in FIG. 1. In this embodiment, the spoiler device 100 is disposed at the rear bumper B, and a gap G (shown in FIG. 6 to be described later) exists between the movable portion 110 and the rear bumper B to prevent structural interference generated when the movable portion 110 moves between the storage position and the expansion position. In addition, the fixed portion 120 including the driving component 122 may be at least one fixed portion. For example, the fixed portion 120 including the driving component 122 is disposed at one of the left and right sides and not disposed at the other of the left and right sides. As such, in an embodiment where the fixed portion 120 including the driving component 122 is disposed at one of the left and right sides, a guide component for guiding the movable portion 110 to move in the front-rear direction may be disposed at the other of the left and right sides. This embodiment is described with an example where a pair of left and right fixed portions 120 including the driving component 122 are disposed, but the disclosure is not limited thereto.

Figure 2:
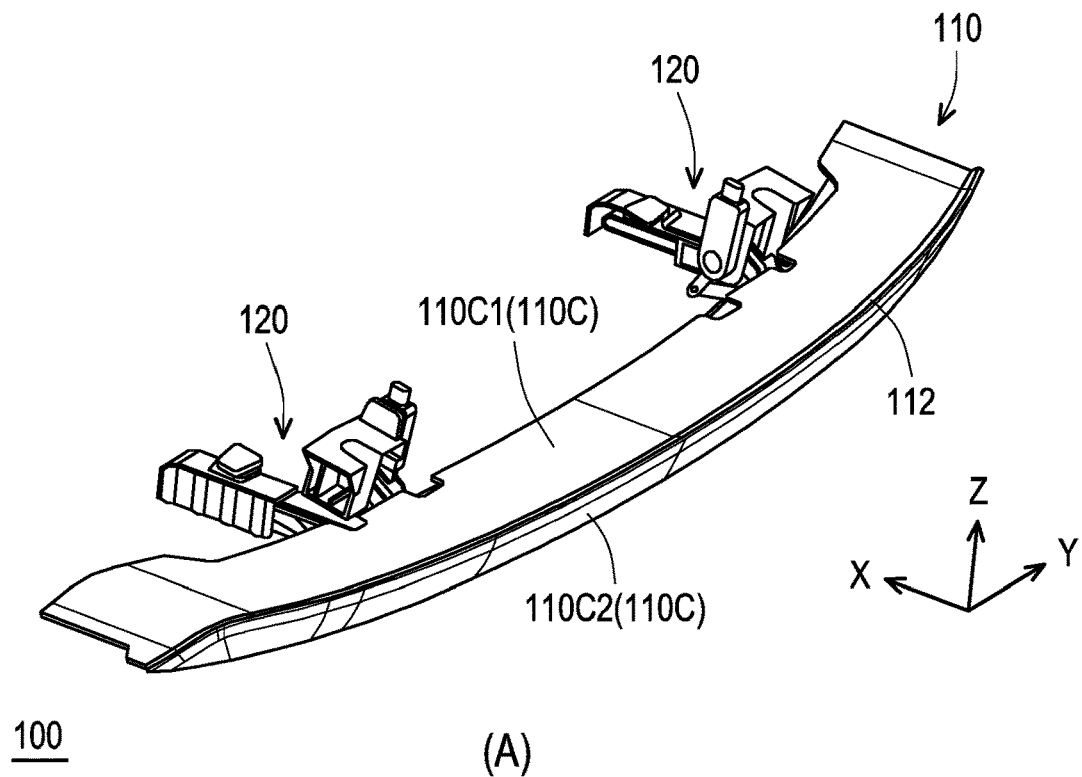
FIG. 2 is a schematic diagram schematically showing the spoiler device of FIG. 1; (A) in FIG. 2 shows the state of the movable portion of the spoiler device at the storage position; (B) in FIG. 2 shows the state of the movable portion of the spoiler device at the expansion position.
Figure 2:
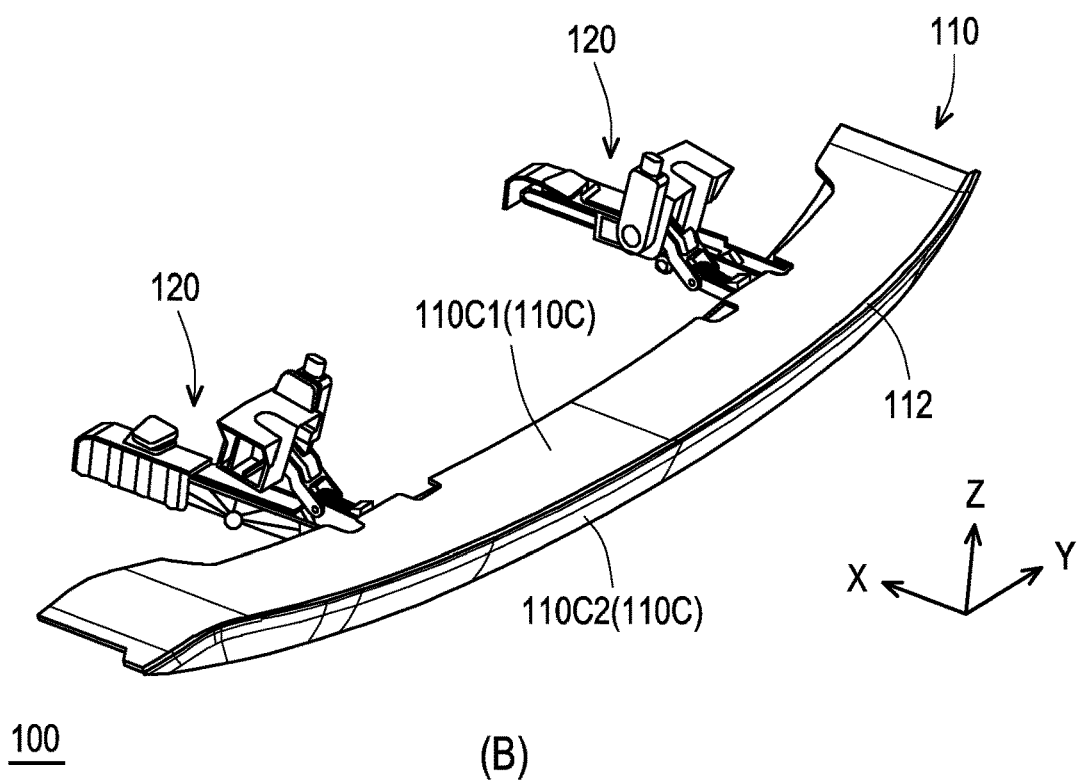

FIG. 2 is a schematic diagram schematically showing the spoiler device of FIG. 1; (A) in FIG. 2 shows the state of the movable portion of the spoiler device at the storage position; (B) in FIG. 2 shows the state of the movable portion of the spoiler device at the expansion position. As shown in FIG. 1 and FIG. 2, an upper surface of a rear side portion of the movable portion 110 has a protrusive portion 112 formed into a protrusive shape protruding toward an upper side of the vehicle, such that the movable portion 110 shields the gap G at the storage position.

As shown in FIG. 1 and FIG. 2, the protrusive portion 112 protruding toward the upper side is disposed on the upper surface of the rear side portion of the movable portion 110, and the amount of protrusion of the protrusive portion 112 protruding toward the upper side is set so as to shield the gap G when the movable portion 110 is at the storage position. During high-speed driving of the vehicle, when the movable portion 110 of the spoiler device 100 is driven by the driving component 122 to move toward the rear side of the vehicle and to be located at the expansion position, even if separation between the spoiler device 100 and the rear bumper B forms the gap G, the structure of the movable portion 110 can prevent foreign objects such as rolled-up mud or gravel from entering the rear bumper B and the spoiler device 100, providing protection.

In addition, the movable portion 110 and the rear bumper B form an appearance with a flush and continuous surface when viewed from the outside. By disposing the protrusive portion 112, the boundary between the spoiler device 100 and the rear bumper B is hidden. Such a design achieves a visually imperceptible boundary line on the structural design. Accordingly, the vehicle rear structure 10 has a functional and aesthetically elegant design that not only prevents the foreign objects rolled up from the road surface from entering the interior of the spoiler device 100 and the rear bumper B, but also enhances a sense of aesthetics. Furthermore, the movable portion 110 and the rear bumper B may also be designed to be non-flush with each other (with non-flush surfaces). By configuring the appearance so as to form a continuous surface with the movable portion 110 slightly protruding from the rear bumper B at the storage position, it is possible to obtain a sense of design of the appearance that emphasizes the presence of the movable portion 110. Nonetheless, the disclosure is not limited thereto.

Figure 3:
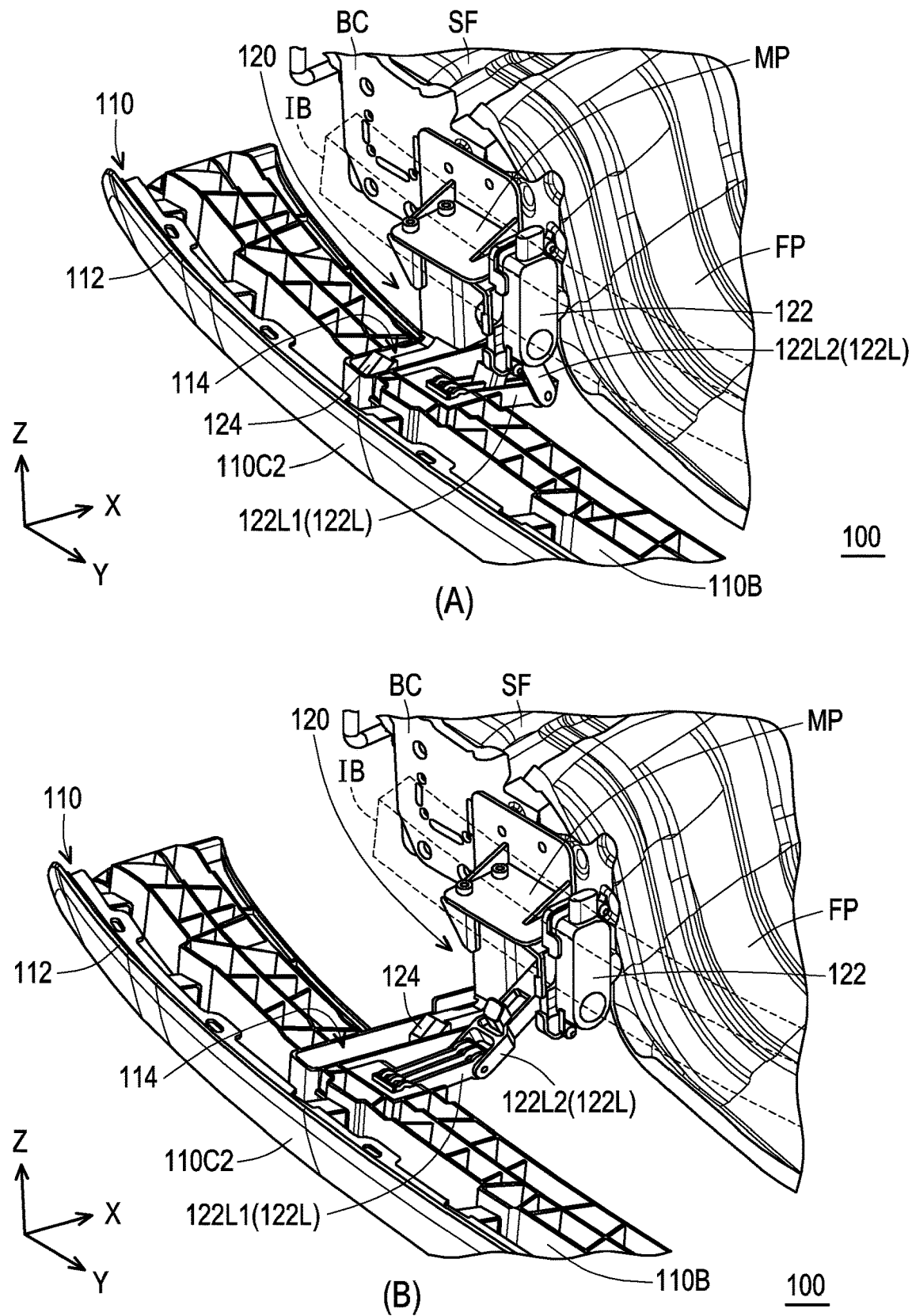
FIG. 3 is a schematic diagram of part of the spoiler device of FIG. 2 viewed from a different perspective; (A) in FIG. 3 shows the state of the movable portion of the spoiler device at the storage position; (B) in FIG. 3 shows the state of the movable portion of the spoiler device at the expansion position.

FIG. 3 is a schematic diagram of part of the spoiler device of FIG. 2 viewed from a different perspective; (A) in FIG. 3 shows the state of the movable portion of the spoiler device at the storage position; (B) in FIG. 3 shows the state of the movable portion of the spoiler device at the expansion position. As shown in FIG. 3, a pair of left and right side frames SF are disposed at two sides (left and right sides) of a floor panel FP of the vehicle, and the side frames SF extend along the front-rear direction. The floor panel FP refers to part of a bottom floor panel or a rear floor panel forming a floor panel portion at the rear side of the vehicle body. In addition, the rear ends of the pair of left and right side frames SF are each connected to an impact beam IB extending along the left-right direction, and the part where the impact beam IB is connected with the rear ends of the side frames SF is a connecting portion. For example, the impact beam IB has an extension component and a beam component. The impact beam IB and side frame SF are fixed to each other by fixing the extension component at the connecting portion. As shown in FIG. 3, the connecting portion is, for example, a beam connecting plate BC formed of a connecting plate material. The beam connecting plate BC is sandwiched between the side frames SF and the impact beam IB, and may serve for fixing the impact beam IB and the spoiler device 100 at the rear ends of the side frames SF.

As shown in FIG. 3, a pair of left and right fixed portions 120 are each mounted on the beam connecting plate BC sandwiched between the pair of left and right side frames SF and the impact beam IB. As shown in FIG. 3, the pair of left and right fixed portions 120 are located at a further rear side of the floor panel FP, and are each disposed on the beam connecting plate BC connected between the pair of left and right side frames SF and the impact beam IB. In FIG. 3, the fixed portion 120 on the left side is shown, and the fixed portion on the right side is omitted. In addition, as shown in FIG. 3, the fixed portion 120 and the beam connecting plate BC may be fixed to each other through a mounting plate MP by utilizing a screw lock, for example. Nonetheless, other manners of fixing such as riveting or welding may also be utilized, and the disclosure is not limited thereto. Furthermore, the driving component 122 may be disposed at an appropriate position of the fixed portion 120.

As shown in FIG. 3, by disposing the fixed portions 120 for mounting the movable portion 110 for driving the spoiler device 100 on the beam connecting plate BC connected between the pair of left and right side frames SF and the impact beam IB, since the side frames SF and the impact beam IB are support components with relatively strong structural strength for the vehicle, the fixed portion can be protected. When being subjected to an impact load, the fixed portion 120 and the driving component 122 disposed at the fixed portion 120 can be protected and prevented from being damaged in whichever of the state where the movable portion 110 is driven by the driving component 122 to move toward the rear side of the vehicle and to be at the expansion position and the state where the movable portion 110 is at the storage position. In addition, by sandwiching the beam connecting plate BC between the pair of left and right side frames SF and the impact beam IB and by mounting the fixed portion 120 on the beam connecting plate BC, the structural strength is further improved, and the driving component 122 is prevented from being affected by the impact load.

Accordingly, designed in consideration of the likelihood of bearing an impact load within a limited space for arrangement, the vehicle rear structure 10 of an embodiment of the disclosure can prevent the driving component 122 from being affected by the impact load, improving the quality of the vehicle rear structure 10.

Figure 4:
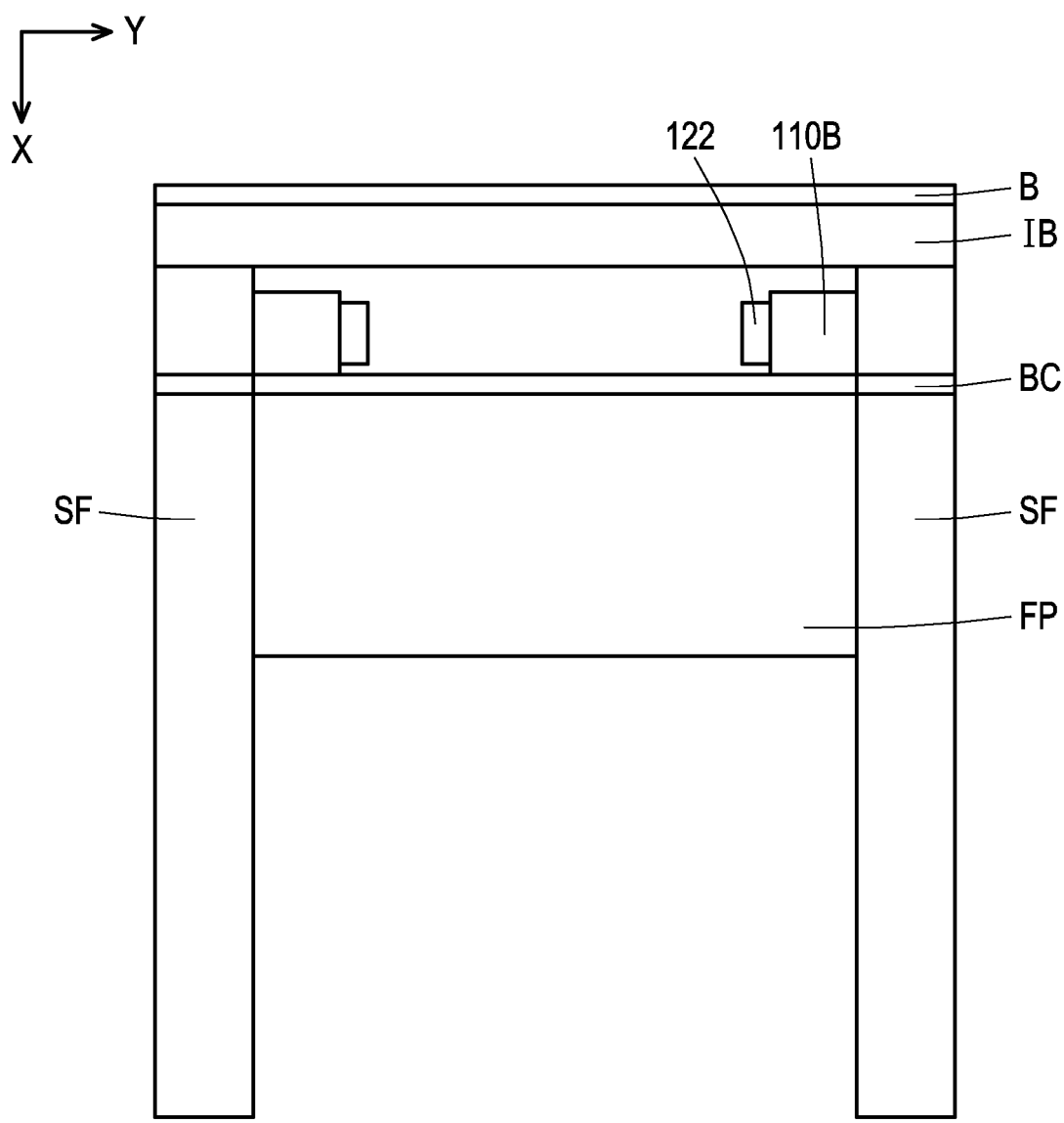
FIG. 4 is a schematic diagram showing an impact load to act upon the rear bumper from the rear side of the vehicle.
Figure 5:
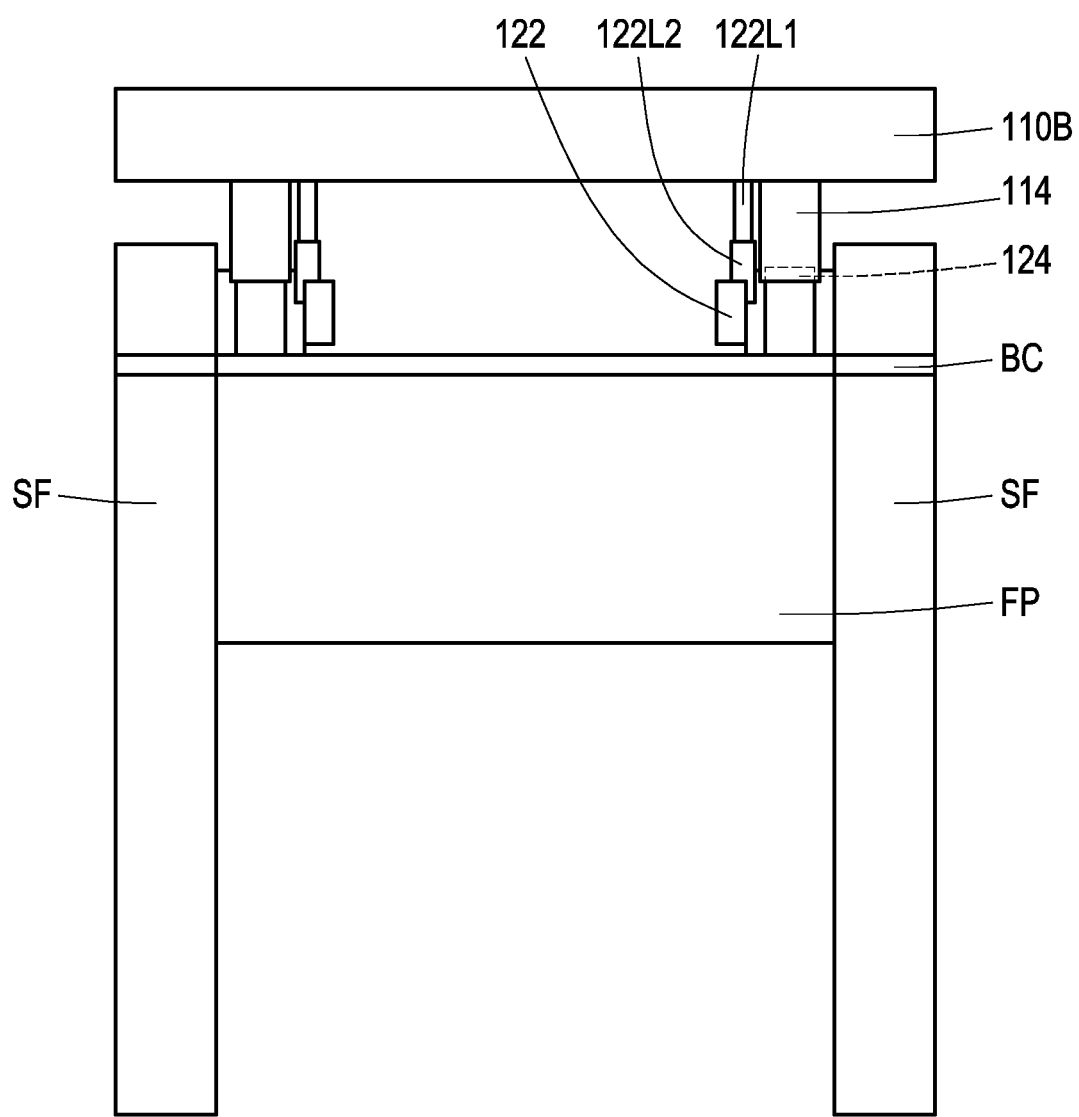
FIG. 5 is a schematic diagram showing FIG. 4 from another perspective.

FIG. 4 is a schematic diagram showing an impact load to act upon the rear bumper from the rear side of the vehicle. FIG. 5 is a schematic diagram showing FIG. 4 from another perspective. In terms of driving, the structure of the movable portion 110 and the fixed portion 120 provided with the driving component 122 for driving the movable portion 110 is further described.

As shown in FIG. 3 to FIG. 5, the pair of left and right fixed portions 120 each include a guiding protrusive portion 124 extending in the front-rear direction, and a main body portion 110B is formed with a guiding groove 114 extending along the front-rear direction. The guiding protrusive portion 124 is slidable along the guiding groove 114 to move the movable portion 110 between the storage position and the expansion position. To be specific, as shown in FIG. 3, the fixed portion 120 is fixed on the beam connecting plate BC by the mounting plate MP. The fixed portion 120 may be, for example, an L-shaped component, of which one end is fixed to the mounting plate MP, and the other end serves as the guiding protrusive portion 124 and, together with the guiding groove 114 disposed in the main body portion 110B, forms a slidably connected structure. Accordingly, by disposing the guiding groove 114 and the guiding protrusive portion 124 slidable along the guiding groove 114, the movable portion 110 can be moved smoothly and stably between the storage position ((A) in FIG. 3) and the expansion position ((B) in FIG. 3), not only improving the structural strength to prevent the driving component 122 from being affected by the impact load, but also further improving stability of the spoiler device 100.

As shown in FIG. 3, the driving component 122 may be mounted at one side of the guiding protrusive portion 124 of the fixed portion 120, and the fixed portion 120 is also provided with, for example, a driving linkage 122L connected between the beam connecting plate BC and the movable portion 110. The driving linkage 122L is formed with, for example, a linkage component, and includes a fixing rod 122L1 and a driving rod 122L2 pivoted with the fixing rod 122L1. The fixing rod 122L1 is fixed to the main body portion 110B of the movable portion 110. One end of the driving rod 122L2 is fixed to the beam connecting plate BC, and the other end is pivotally connected with the fixing rod 122L1.

During relatively high-speed driving of the vehicle, if the spoiler device 100 is activated to drive the movable portion 110 to move toward the rear side of the vehicle through the driving component 122, the pivot angle between the driving rod 122L2 of the driving linkage 122L relative to the fixing rod 122L1 is increased, and the movable portion 110 moves toward the rear side of the vehicle under the propelling force of the driving rod 122L2. At this time, since the movable portion 110 moves toward the rear side of the vehicle, the position of the front end of the guiding protrusive portion 124 located in the guiding groove 114 is changed from the rear side to the front side, forming the expansion position as shown in (B) of FIG. 3. During low-speed driving (or standing) of the vehicle, if the spoiler device 100 is not activated and the movable portion 110 is restored to the storage position, the movable portion 110 moves toward the front side of the vehicle, and the pivot angle between the driving rod 122L2 of the driving linkage 122L relative to the fixing rod 122L1 is decreased. At this time, since the movable portion 110 moves toward the front side of the vehicle, the position of the front end of the guiding protrusive portion 124 located in the guiding groove 114 forms the storage position as shown in (A) in FIG. 3.

Furthermore, in an embodiment of the disclosure, regarding the position where the spoiler device 100 is disposed, clever use of the existing support structure of the vehicle is taken into consideration, and the driving component 122 of the spoiler device 100 can be protected even if encountering an impact load from the rear side of the vehicle.

FIG. 4 shows the state of the movable portion 110 of the spoiler device 100 at the storage position viewed from right above. It is assumed that an impact load is to act upon the rear bumper B from the rear side of the vehicle when the spoiler device 100 is viewed from right above as shown in FIG. 4. At this time, since the driving component 122 for driving the movable portion 110 is surrounded by the impact beam IB, extension components of the side frames SF, and the beam connecting plate BC connected between the pair of left and right side frames SF and the impact beam IB, when being subjected to the impact load, the rear bumper B and the impact beam IB protrude toward the front side of the vehicle and deform due to the force of the impact load (the most apparently deformed place indicates the middle part with the minimum structural strength, and the deformation increases as the impact load increases). Nonetheless, even in this case, the driving component 122 surrounded by the side frames SF and the beam connecting plate BC is still protected when being subjected to an impact load within a certain range.

FIG. 5 shows the state of the movable portion 110 of the spoiler device 100 at the expansion position viewed from right below (and the rear bumper B and the impact beam IB cannot be seen from this viewing angle). It is assumed that an impact load is to act upon the rear bumper B from the rear side of the vehicle when the spoiler device 100 is viewed from right below as shown in FIG. 5. At this time, since the driving linkage 122L for driving the movable portion 110 and components such as the guiding protrusive portion 124 and the guiding groove 114 have their structural strength, when being subjected to the impact load, the driving component 122 is protected by the structural strength of the driving linkage 122L and components such as the guiding protrusive portion 124 and the guiding groove 114.

As shown in FIG. 1 to FIG. 3, the movable portion 110 includes the main body portion 110B extended in the left-right direction of the vehicle, and a length of the main body portion 110B is longer than a distance between the pair of left and right side frames SF. For example, when the spoiler device 100 is mounted at the vehicle rear structure 10, the left and right side ends of the main body portion 110B are respectively located at the left and right side ends of the rear side of the vehicle, that is, the length of the main body portion 110B in the left-right direction is substantially equal to a length of the rear bumper B in the left-right direction.

Accordingly, by disposing the main body portion 110B of the movable portion 110 such that the length thereof is longer than the distance between the pair of left and right side frames SF, even if separation between the spoiler device 100 and the rear bumper B forms the gap G, the main body portion 110B of the movable portion 110 can prevent foreign objects such as rolled-up mud or gravel from entering the interior of the rear bumper B and the spoiler device 100, providing protection.

To be more specific, as shown in FIG. 1 to FIG. 3, the movable portion 110 includes the main body portion 110B and a covering portion 110C disposed to cover at least an upper surface of the main body portion 110B. As such, by disposing the movable portion 110 to be formed with the main body portion 110B and the covering portion 110C covering at least the upper surface of the main body portion 110B, and forming the protrusive portion 112 at the covering portion 110C, even if separation between the spoiler device 100 and the rear bumper B forms the gap G, the covering portion 110C of the movable portion 110 can prevent foreign objects such as rolled-up mud or gravel from entering the interior of the rear bumper B and the spoiler device 100, providing protection.

As shown in FIG. 2, the covering portion 110C includes an upper covering portion 110C1 covering the upper surface of the main body portion 110B and a lower covering portion 110C2 covering a lower surface of the main body portion 110B, and the protrusive portion 112 is formed at a connecting portion of the upper covering portion 110C1 and the lower covering portion 110C2. In FIG. 3, illustration of the upper covering portion 110C1 is omitted to show the structure of the fixed portion 120. The movable portion 110 is disposed such that the protrusive portion 112 is formed at the connecting portion of the upper covering portion 110C1 and the lower covering portion 110C2. In other words, when the main body portion 110B is formed, the protrusive portion 112 is formed in a manner as follows: the lower covering portion 110C2 is formed into a structure covering the lower surface and the rear surface (the surface visible in the front perspective when viewed from the rear side of the vehicle) of the main body portion 110B, and the upper end edge of the rear surface and the end edge of the upper covering portion 110C1 are connected to each other at the connecting portion similar to a protruding edge protruding upward.

As such, even if separation between the spoiler device 100 and the rear bumper B forms the gap G, by the design of the upper covering portion 110C1 and the protrusive portion 112 of the movable portion, foreign objects such as rolled-up mud or gravel can be blocked from entering the interior of the rear bumper and the spoiler device 100, providing protection. In addition, a sense of aesthetics is also enhanced by the functional and aesthetically elegant design.

Figure 6:
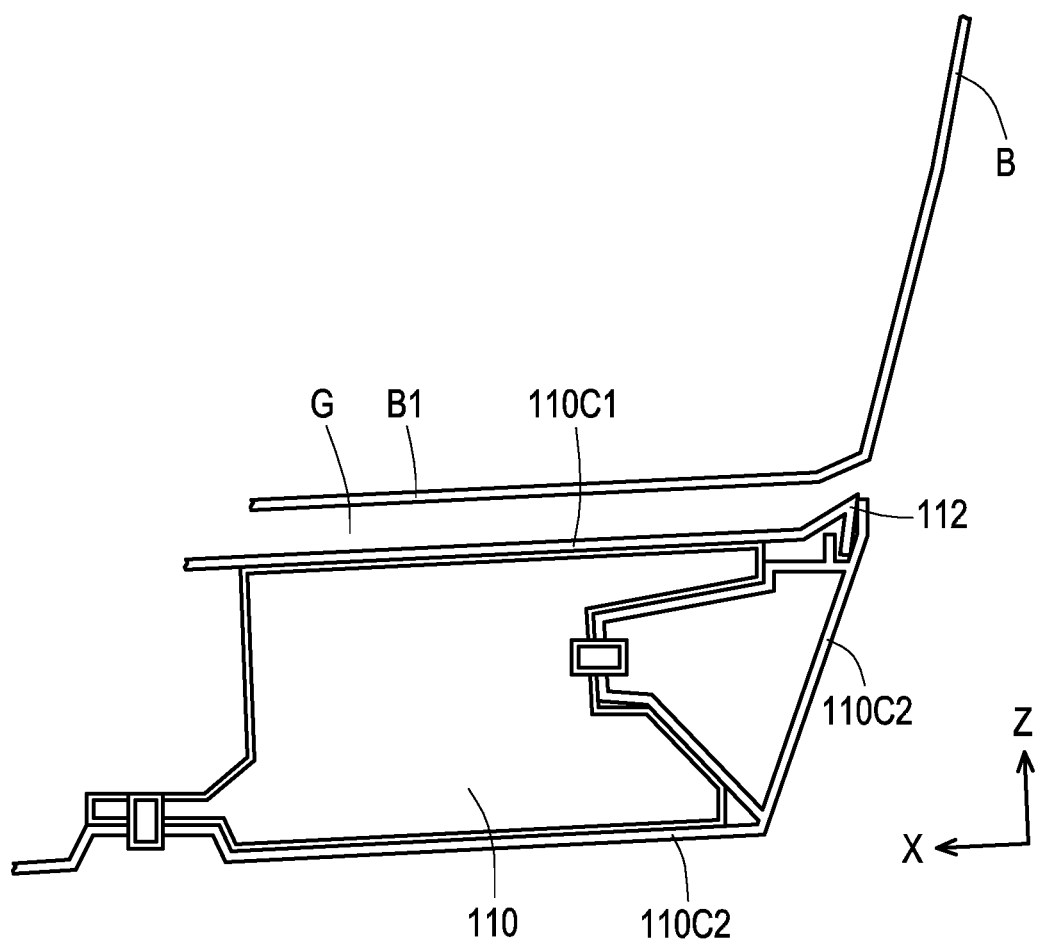
FIG. 6 is a schematic diagram schematically showing part E of (A) in FIG. 1 viewed from another perspective.

FIG. 6 is a schematic diagram schematically showing part E of (A) in FIG. 1 viewed from another perspective. The rear bumper B includes an extended portion B1 extended along an upper surface of the movable portion 110 toward the front side of the vehicle. The gap G is located between the extended portion B1 and the upper surface of the movable portion 110. In other words, as shown in FIG. 2 and FIG. 6, the gap G is located between the extended portion B1 and an upper surface of the upper covering portion 110C1. When viewed from the outside (when viewed from the rear side of the vehicle), by disposing the protrusive portion 112 of the lower covering portion 110C2, the movable portion 110 and the rear bumper B form an appearance with a continuous surface, such that the boundary between the spoiler device 110 and the rear bumper B is hidden. In addition, since the gap G may be shielded by the protrusive portion 112, the vehicle rear structure 10 has a functional and aesthetically elegant design that not only prevents foreign objects rolled up from the road surface from entering the interior of the spoiler device 100 and the rear bumper B, but also enhances a sense of aesthetics.

In summary of the foregoing, in the vehicle rear structure of the embodiments of the disclosure, by disposing the fixed portion for mounting the movable portion for driving the spoiler device at the connecting portion connected between the pair of left and right side frames and the impact beam, since the side frames and the impact beam are support components with relatively strong structural strength for the vehicle, the fixed portion can be protected. When being subjected to an impact load, the driving component disposed at the fixed portion can be protected and prevented from being damaged in whichever of the state where the movable portion is driven to move toward the rear side of the vehicle and to be at the expansion position and the state where the movable portion is at the storage position. Accordingly, designed in consideration of the likelihood of bearing an impact load within a limited space for arrangement, the vehicle rear structure can prevent the driving component from being affected by the impact load, improving the quality of the vehicle rear structure. In addition, the vehicle rear structure has a functional and aesthetically elegant design that not only prevents foreign objects rolled up from the road surface from entering the interior of the spoiler device and the rear bumper, but also enhances a sense of aesthetics.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A vehicle rear structure comprising:
    a spoiler device disposed at a rear bumper of a vehicle, the spoiler device comprising:
        a movable portion disposed movable between a storage position and an expansion position protruding from the rear bumper toward a rear side of the vehicle; and
        at least one fixed portion comprising a driving component for driving the movable portion to move in a front-rear direction of the vehicle;
    a floor panel;
    a pair of left and right side frames disposed at two sides of the floor panel and extending along the front-rear direction of the vehicle; and
    an impact beam extending along a left-right direction of the vehicle and connected to rear ends of the pair of left and right side frames through a connecting portion,
    wherein the at least one fixed portion is located at a further rear side of the floor panel, and is disposed at the connecting portion connected between the pair of left and right side frames and the impact beam.
2. The vehicle rear structure according to claim 1, wherein the at least one fixed portion is mounted on a beam connecting plate sandwiched between the pair of left and right side frames and the impact beam.
3. The vehicle rear structure according to claim 1, wherein the movable portion comprises:
    a main body portion extended in the left-right direction of the vehicle, wherein a length of the main body portion is longer than a distance between the pair of left and right side frames.
4. The vehicle rear structure according to claim 3, wherein the at least one fixed portion comprises a guiding protrusive portion extending in the front-rear direction, the main body portion is formed with a guiding groove extending along the front-rear direction, and the guiding protrusive portion is slidable along the guiding groove.

5. The vehicle rear structure according to claim 2, wherein the movable portion comprises:
   a main body portion extended in the left-right direction of the vehicle, wherein a length of the main body portion is longer than a distance between the pair of left and right side frames.

6. The vehicle rear structure according to claim 5, wherein the at least one fixed portion comprises a guiding protrusive portion extending in the front-rear direction, the main body portion is formed with a guiding groove extending along the front-rear direction, and the guiding protrusive portion is slidable along the guiding groove.

\* \* \* \* \*